Aug. 16, 1938.  J. S. MARTIN  2,127,041
METER BASE AND COVER
Filed March 21, 1936
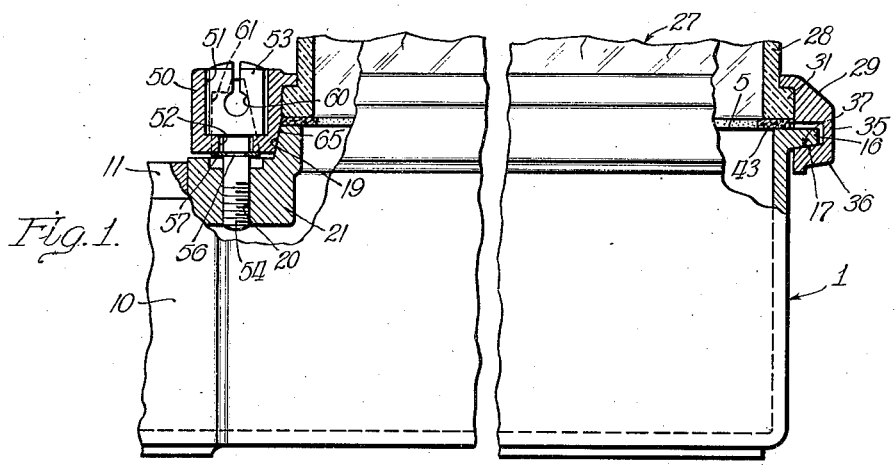
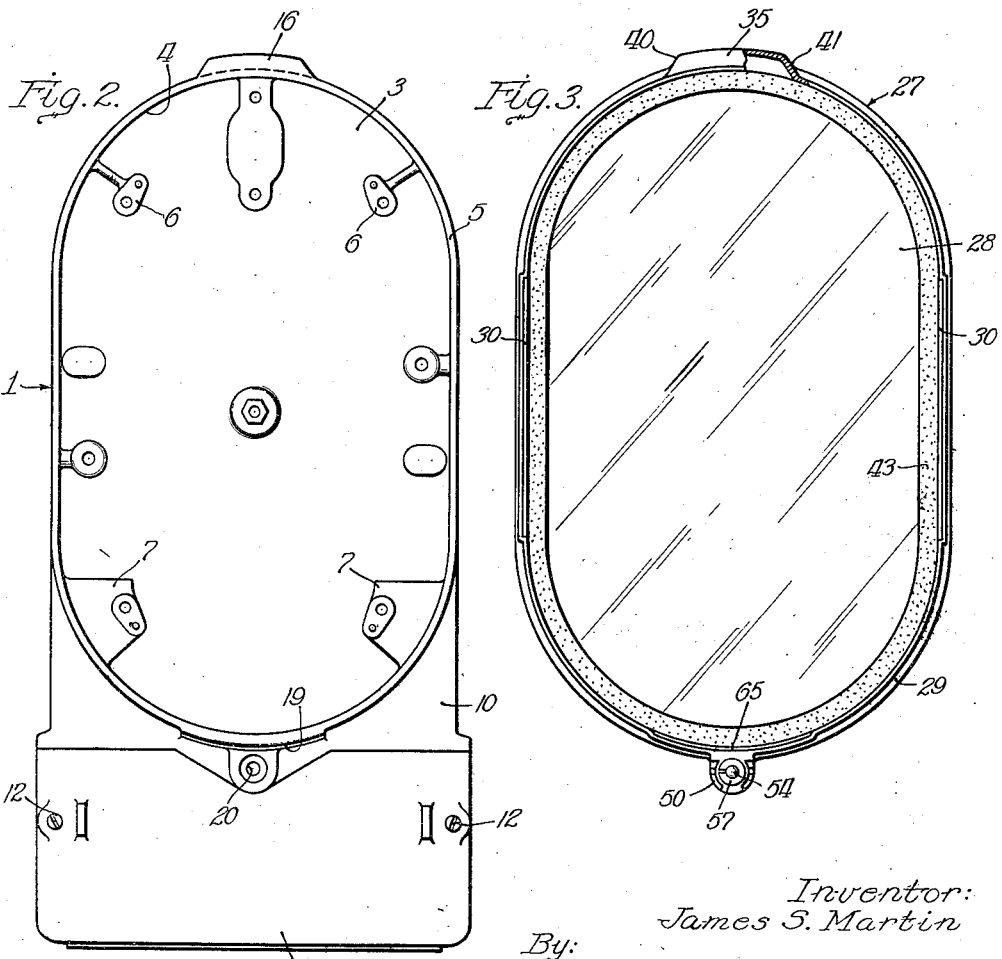
Inventor:
James S. Martin Patented Aug. 16, 1938

2,127,041

UNITED STATES PATENT OFFICE 2,127,041

METER BASE AND COVER

James S. Martin, Springfield, Ill., assignor to Sangamo Electric Company, Springfield, Ill., a corporation of Illinois Application March 21, 1936, Serial No. 70,173

11 Claims. (Cl. 220—55)

The present invention relates to housings for meters and like instruments, such housings usually including a base of metal or the like and a removable cover, usually of glass, releasably secured to the base and serving when detached to provide for access to the instrument enclosed in the housing.

Heretofore it has been customary to secure and seal meter covers to meter bases by means of studs, bails, encircling metallic bands and the like, but such securing and sealing means has not been satisfactory in all cases, particularly so far as securing a good tight seal is concerned.

The principal object of the present invention is the provision of a simple but effective means for fastening a meter cover to a meter base so as not only to secure these parts firmly together, but to prevent entrance into the interior of the meter of moisture, dust, or other foreign material.

Another object of the present invention in this connection is the provision of improved interlocking means between the cover and the base and so constructed and arranged that by the use of a single clamping member the cover can be secured in place, and a further object of the present invention is the provision of means making it possible to secure a uniform clamping pressure between the cover and the meter base by the use of only a single clamping member.

These and other objects of the present invention will be apparent to those skilled in the art after a consideration of the following detailed description of the preferred embodiment of the present invention, taken in conjunction with the accompanying drawing illustrating such embodiment.

In the drawing:

Figure 1 is a fragmentary side elevation, on an enlarged scale and with certain parts shown in section, of a meter base and cover embodying the principles of the present invention;

Figure 2 is a plan view of the complete meter base; and

Figure 3 is a view looking inwardly into the meter cover when the same is detached.

Referring now to the drawing, the reference numeral 1 indicates the meter base in its entirety, the base including a meter receiving chamber 3 having an opening 4 the rim 5 of which lies in a single plane. The base carries suitable studs 6, brackets 7, and other suitable means of more or less conventional structure by which the instrument and associated parts may be secured in place in the base 1. The meter base 1 also includes a terminal chamber 10 which is preferably closed by a cover 11, and the terminal chamber 10 lies below the plane of the base rim 5, as best indicated in Figure 1. Any suitable means, such as screws 12, may be provided for holding the terminal cover 11 in place.

The meter base 1 is provided at one end with a lug 16 which is flat at its upper side in the plane of the base opening 5 and at its lower side is tapered or inclined, as indicated at 17 in Figure 1. At the other end of the meter base the rim 5 is formed with an upwardly inclined wedging surface 19, and adjacent the surface 19 is a threaded opening 20 formed in a thickened boss section 21.

The cover for the meter base is indicated in its entirety by the reference numeral 27, and, following more or less conventional practice, includes a glass member 28 and a metallic rim 29 fastened in any desired manner, usually by spring plates 30, to a flange 31 formed on the rim of the glass member 28. At one end of the cover 27 the rim 29 is formed with a pocket or socket section 35 which includes an undercut portion 36 presenting an upwardly facing inclined surface 37. The ends of the socket 35 are closed as at 40 and 41 (Figure 3), and the inclined surface 37 is adapted to engage against the under surface 17 of the meter base lug 16, as best shown in Figure 1. A gasket 43 of suitable material is carried by the cover 27 and is adapted to seal the space between the cover 27 and the base 1 when the cover is clamped in position.

At the other end of the cover 27 a lug 50 is provided, preferably integral with the cover rim 29. The lug 50 is apertured, as at 51 and 52, and receives a clamping screw 53 having a threaded shank 54 that is adapted to be screwed into the opening 20 in the meter base 1. An annular groove 56 is cut in the shank of the clamping screw 53 for the purpose of receiving a split ring 57 which acts to hold the screw 53 in position in the cover lug 50. The screw 53 is provided with an opening 60, and openings 61 of any suitable configuration are formed in opposite sides of the lug 50, the openings 60 and 61 serving to receive any suitable sealing means by which undetected tampering with the meter housing is prevented.

The lug 50 is provided with an inner face 65 which is inclined in complementary fashion with respect to the upwardly inclined surface 19 at the lower end of the meter base 1.

In operation, the cover 27 is applied to the meter base 1 by first engaging the pocket 35 in the cover rim 29 over the lug 16 at the upper end of the meter base 1. This brings the inclined surfaces 17 and 37 into engagement adjacent their outer portions, and then the cover is pulled down gently until the sealing screw 53 is in a position to be screwed into the threaded opening 20. This brings the inclined or wedging surfaces 19 and 65 into engagement also, initially at their outer portions. The screw 53 is then tightened, and at first the movement of the lug surface 65 along the upwardly inclined surface 19 causes the cover 27 to be shifted, to the left as viewed in Figure 1, and this shifting motion causes the tapered surfaces 17 and 37 to draw the upper ends of the meter cover and meter base together simultaneously with the action of the screw 53 in drawing the lower ends together. As the clamping screw 53 continues to be tightened, the gasket 43 becomes compressed, but the pressure between the cover and the base is uniform practically throughout the entire circumference of the parts, due to the simultaneous action of the inclined wedging surfaces 17, 37 and 19, 65. It is to be noted that the cover 27 is thus firmly and securely fastened in position in a moisture proof manner by the use of only one clamping member, and that the cover is clamped with a substantially uniform pressure entirely around the rim 5. From Figure 1 it will be seen that the clamping surfaces on the base lug 16 and the cover pocket 35 are disposed in a plane lying at a relatively small angle with respect to the horizontal and that the plane of the wedging surfaces 19 and 65 at the other end lies at substantially the same relatively small angle with respect to the vertical. By virtue of this construction, when the cover is brought into position by first engaging the pocket 35 over the lug 16 and then tightening the clamping screw 53, the resulting relative movement of the cover 27 is both downwardly and longitudinally with respect to the meter base 1, and that with only one fastening member the cover is clamped to the base with a uniform pressure. Also, where only one clamping member is used, the cover can be easily and quickly but securely fastened in position or removed from the meter base.

While I have thus shown and described above the preferred structure in which the principles of my invention have been embodied, it is to be understood that my invention is not to be limited to the specific details shown and described above but that, in fact, widely different means may be employed in the practice of the broader aspects of my invention.

What I claim, therefore, and desire to secure by Letters Patent, is:

1. In combination, a meter base having a lug at one end with an inclined under surface, a part on the other end of the meter base provided with an upwardly inclined face, a meter cover fitting said base and having complementarily inclined portions engaging the underside of said lug and said face, and means adjacent the latter for urging the cover down on said upwardly inclined face for tightening both portions of the meter cover onto the base.

2. In combination, a meter base having a lug at one end with an under surface, a meter cover fitting said base and having a portion with an inner surface adapted to engage the under side of said lug, at least one of said surfaces sloping toward the inside of said meter base, wedge surfaces on said cover and base opposite said lug and cooperating portion on the cover, said wedge surfaces sloping away from said lug and inwardly of the meter base, and means acting transversely to the general plane of the meter cover for urging the cover toward the base and drawing said wedge surfaces together so as to clamp the adjacent ends of the cover and base together and to simultaneously shift the cover relatively to the base so as to cause said lug to firmly clamp the other ends of cover and base together.

3. In combination, a meter base having a lug at one end, a part on the other end provided with an upwardly inclined face, a meter cover fitting said base and having a downwardly inclined face adapted to engage the upwardly inclined face on the meter base and a pocket adapted to fit over and engage the underside of said lug, the plane of said engagement being inclined downwardly and inwardly of the meter base, and means on the base and cover adjacent said faces for tightening that end of the cover on the base and forcing the cover pocket at the other end of the cover against said lug so as to tighten the other end of the cover on the base at the same time.

4. In combination, a meter base provided with a lug at one end, means at the other end of the base having a wedging surface, a meter cover adapted to fit said base and having a socket adapted to receive said lug with a portion engaging the under surface of said lug, the plane of said engagement being inclined downwardly toward the other end of the base, said cover having a portion at the other end adapted to engage the wedging surface on said base, the plane of said last-mentioned engagement being downwardly inclined away from the end of the meter base having the lug, and clamping means for said cover and base acting generally transversely to the plane of the cover for urging said other end of the latter against the wedging surface on said base for clamping said cover against said base with uniform pressure on said gasket.

5. In combination, a meter base having an opening with a co-planar rim, a lug carried by the meter base at one end thereof with its upper surface in the plane of said rim and having an inclined lower surface, a terminal chamber formed at the other end of said meter base below the plane of said rim, there being an upwardly inclined wedging surface at the end of said opening opposite said lug and below the plane of said rim, a meter cover adapted to fit said base and having a socket adapted to receive said lug with a portion bearing against the under surface of said lug, an apertured lug carried by said cover at the end thereof opposite said socket and extending below the general plane of the cover rim and having a wedge surface adapted to cooperate with the wedge surface on said base, and a clamping member carried by said cover lug and adapted to engage said base after the cover is applied to the latter by first engaging the socket over the lug on the base and then bringing said wedge surfaces into engagement, tightening of said clamping member cooperating with said socket, base lug and wedging surfaces to cause the cover to be clamped with substantially uniform pressure onto the base.

6. In combination, a meter base having an opening with a rim and a lug at one end with an under surface inclined downwardly toward the other end of the base and at a relatively small angle with respect to the plane of the rim, means at the other end on said base having a wedging surface angled generally upwardly toward said one end of the base and disposed at substantially the same relatively small angle with respect to a plane normal to the plane of said rim, a meter cover fitting said base and having complementarily formed portions engaging the underside of said lug and said face, and means at said other end of the base for tightening said cover downwardly onto the base.

7. In combination, a meter base, a cover therefor, means at one end of the base and means at one end of the cover, said two means being disposed in interengagement in a plane that is inclined downwardly toward the other end of the meter base, whereby movement of the cover longitudinally of the base toward said other end tightens said end of the cover against the base, means at said other end of the base and means at the other end of the cover in interengagement in a plane that is inclined generally upwardly toward said one end of the base and cover, whereby movement of said other end of the cover toward the base causes longitudinal movement of the cover relative to the base, and means at said other end for tightening the cover onto the base at both ends of the latter.

8. In combination, a meter base having a lug at one end with an under surface inclined outwardly and upwardly of the base, a part on the other end of the meter base provided with a face inclined upwardly and inwardly, a meter cover fitting said base and having a first portion engaging the underside of the lug and a second portion engaging the upwardly and inwardly inclined face on the meter base, and clamping means for tightening said second portion of the cover against said upwardly and inwardly inclined face so as to shift said cover relative to the base and cause said lug to draw said first portion of the cover tightly against the base.

9. In combination, a meter base having an opening with a co-planar rim, a meter cover for said base and having a part adapted to fit against said rim, means on said cover and base at one end thereof forming interengaging wedging surfaces, means at the other end forming wedging surfaces adapted to be engaged after said first surfaces are engaged, both sets of said interengaging surfaces lying in planes that extend generally downwardly and inwardly of the meter base away from said one end thereof, a lug carried at said other end of the cover, and tightening means adapted to be connected to the base and said lug for shifting said cover so as to cause said wedging surfaces to clamp the cover tightly against said rim.

10. In combination, a meter base having an opening with a co-planar rim, a lug carried by the meter base at one end thereof and having an inclined lower surface, there being an upwardly inclined wedging surface at the end of said opening opposite said lug, a meter cover adapted to fit said base and having a socket adapted to receive said lug with a portion bearing against the under surface of said lug, an apertured lug carried by said cover at the end thereof opposite said socket and having a wedge surface adapted to cooperate with the wedge surface on said base, and a clamping member carried by said cover lug and adapted to engage said base after the cover is applied to the latter by first engaging the socket over the lug on the base and then bringing said wedge surfaces into engagement, tightening of said clamping member cooperating with said socket, base lug and wedging surfaces to cause the cover to be clamped with substantially uniform pressure onto the base.

11. A housing for meters and the like comprising a base, a cover therefor, means forming a pair of angularly disposed interengaging surfaces at each end of said cover and base, and clamping means at one end of said cover and base and acting against the cover to force it in a direction toward the base, the plane of engagement of each pair of said surfaces being angled generally downwardly and toward said clamping means, the angle of the plane of the surfaces adjacent said clamping means relative to said direction being substantially equal to the angle of the plane of the interengaging surfaces at the other end of the base relative to the direction of movement of the cover occasioned by tightening the cover at the other end of the base.

JAMES S. MARTIN.

CERTIFICATE OF CORRECTION.

Patent No. 2,127,041.   August 16, 1938.

JAMES S. MARTIN.

It is hereby certified that error appears in the printed specification of the above numbered patent requiring correction as follows: Page 2, second column, lines 37 and 38, claim 4, strike out the words "for clamping said cover against said base with uniform pressure on said gasket"; and that the said Letters Patent should be read with this correction therein that the same may conform to the record of the case in the Patent Office.

Signed and sealed this 11th day of October, A. D. 1938.

Henry Van Arsdale

(Seal)   Acting Commissioner of Patents.